(12) United States Patent
Bastable et al.

(10) Patent No.: US 8,055,660 B2
(45) Date of Patent: Nov. 8, 2011

(54) SYSTEM FOR HANDLING PROGRAM META-DATA

(75) Inventors: Ian Bastable, Fareham (GB); Ian Parsons, Bournemouth (GB)

(73) Assignee: NDS Limited, Staines, Middlesex (GB)

( * ) Notice: Subject to any disclaimer, the term of this patent is extended or adjusted under 35 U.S.C. 154(b) by 0 days.

(21) Appl. No.: 12/928,974

(22) Filed: Dec. 23, 2010

(65) Prior Publication Data

US 2011/0099581 A1      Apr. 28, 2011

Related U.S. Application Data

(63) Continuation of application No. 11/663,930, filed as application No. PCT/GB2005/002582 on Jun. 28, 2005, now Pat. No. 7,865,467.

(60) Provisional application No. 60/620,821, filed on Oct. 21, 2004.

(30) Foreign Application Priority Data

Oct. 20, 2004     (GB) .................................. 0423323.5

(51) Int. Cl.
    *G06F 17/30* (2006.01)
(52) U.S. Cl. ....................................................... 707/736
(58) Field of Classification Search ........... 707/2, 104.1, 707/736; 348/465
    See application file for complete search history.

(56) References Cited

U.S. PATENT DOCUMENTS

| | | | |
|---|---|---|---|
| 5,844,620 A | 12/1998 | Coleman et al. | |
| 5,856,973 A * | 1/1999 | Thompson | 370/389 |
| 6,731,628 B1 | 5/2004 | Shiomoto et al. | |
| 6,906,733 B1 | 6/2005 | Sullivan | |
| 7,071,993 B2 * | 7/2006 | Kim | 348/465 |
| 2001/0027562 A1 | 10/2001 | Schein et al. | |
| 2002/0184625 A1 | 12/2002 | Allport | |
| 2003/0023975 A1 | 1/2003 | Schrader et al. | |
| 2003/0090524 A1 | 5/2003 | Segerberg et al. | |
| 2003/0145085 A1 | 7/2003 | Baldwin et al. | |
| 2003/0208761 A1 | 11/2003 | Wasserman et al. | |
| 2004/0040036 A1 | 2/2004 | An | |
| 2004/0062277 A1 | 4/2004 | Flavin et al. | |
| 2006/0062059 A1 | 3/2006 | Smith et al. | |

FOREIGN PATENT DOCUMENTS

| | | |
|---|---|---|
| WO | WO 00/45294 | 8/2000 |
| WO | WO 01/90949 A1 | 11/2001 |

OTHER PUBLICATIONS

Jan. 11, 2010 Office Communication in connection with EP 05 756 958.4.

(Continued)

*Primary Examiner* — Etienne Leroux
(74) *Attorney, Agent, or Firm* — Husch Blackwell LLP

(57) ABSTRACT

A method of accessing program meta-data is disclosed. The method includes receiving a plurality of program meta-data virtual containers, at least one of the virtual containers comprising normalized program meta-data of programs having instances in a plurality of time windows, receiving an input indicating a selected time window, the input at least one of comprises and refers to a time-window identifier identifying the selected time window, and using the time-window identifier to filter the plurality of virtual containers, so as to obtain a subset of the program meta-data which corresponds to the selected time window. Related apparatus and methods are also disclosed.

20 Claims, 6 Drawing Sheets

OTHER PUBLICATIONS

ATSC A/65B Standard: Program and System Information Protocol for Terrestrial Broadcast and Cable (Revision B) (Mar. 18, 2003).
ETSI TS 102 822-3-1 Broadcast and On-Line Services: Search, select and rightful use of content on personal storage systems ("TV-Anytime Phase 1"); part 3: Metadata; Sub-part 1: Metadata schemas (V1.1.1) (Oct. 2003).
ETSI EN 300 468 Digital Video Broadcasting (DVB); Specification for Service Information (SI) in DVB systems (V1.4.1) (European Broadcasting Union, Nov. 2000).
Feb. 25, 2011 Office Action in connection with prosecution of U.S. Appl. No. 12/927,604 (9 pgs.).

* cited by examiner

SYSTEM FOR HANDLING PROGRAM META-DATA

CROSS-REFERENCE TO RELATED APPLICATIONS

The present application is a continuation of application Ser. No. 11/663,930, which was a 35 USC §371 application of PCT Patent Application PCT/GB2005/002582, filed on 28 Jun. 2005 and published in the English language as WO 2006/043017 on 27 Apr. 2006, which claims priority from UK Patent Application No. 0423323.5, filed 20 Oct. 2004, and from U.S. Provisional Patent Application Ser. No. 60/620,821, filed 21 Oct. 2004, the disclosures of which are hereby incorporated herein by reference.

FIELD OF THE INVENTION

The present invention generally relates to television systems.

BACKGROUND OF THE INVENTION

There are known in the art schemes, such as schemes of Digital Video Broadcasting-System Information (DVB-SI), schemes of TV-Anytime, and schemes of Advanced Television Systems Committee (ATSC) A65/B Program and System Information Protocol (PSIP), that convey program meta-data organized by time.

DVB-SI schemes are described in the European Telecommunications Standards Institute (ETSI) document EN 300 468, which is available at ETSI website www.etsi.org.

TV-Anytime schemes are described in the ETSI document TS 102 822-3-1, which is available at the TV-Anytime Forum website www.tv-anytime.org.

ATSC A/65B PSIP schemes are described at the ATSC website www.atsc.org/standards.html.

DVB-SI and TV-Anytime schemes, for example, also group program meta-data for programs that appear more than once into a single virtual container. However, in such schemes there is no access to only portions of a single virtual container and thus the single virtual container cannot be addressed by time window alone.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, seeks to provide a method of handling program meta-data and of enabling a set-top box (STB) to handle normalized program meta-data in a way that allows the STB to acquire only portions of the normalized program meta-data for rendering an Electronic Program Guide (EPG) which filters the program meta-data by time.

The term "meta-data" is used throughout the present specification and claims to include information descriptive of or otherwise referring to a content stream or a portion thereof. Meta-data may include, for example, pointers, tags, codes, flags, editorial information, and indexing information. At least part of the meta-data may be used to enable or disable interactive operations, such as EPG related operations, depending, for example, on values assigned to the tags or the flags. In a case where the content stream is associated with at least one television program, the pointers, tags, codes, flags, editorial information and indexing information may point to, describe, and/or index segments of the at least one television program as well as portions of the content stream.

It is appreciated that the contents of the meta-data may preferably pertain to either a plurality of users or an individual user. The meta-data may be used to enable operations on the at least one television program, if associated with the content stream, and/or on content in the content stream. The meta-data may be available from one or many broadcast sources at one or more times when the at least one television program is broadcasted or at times before the at least one television program is broadcasted.

The term "normalize", in all of its grammatical forms, is used throughout the present specification and claims to refer to grouping of instances of programs that share at least one editorial description item of the content.

The term "instance" is used throughout the present specification and claims to refer to an occurrence of a program or an event, broadcast or transmitted at a specific date and time. If the same program or event is broadcasted or transmitted more than once, each time the program or the event is broadcasted or transmitted constitutes an instance of the program or the event.

There is thus provided in accordance with a preferred embodiment of the present invention a method of accessing program meta-data, the method including receiving a plurality of program meta-data virtual containers, at least one of the virtual containers including normalized program meta-data of programs having instances in a plurality of time windows, receiving an input indicating a selected time window, the input at least one of comprises and refers to a time-window identifier identifying the selected time window, and using the time-window identifier to filter the plurality of virtual containers so as to obtain a subset of the program meta-data which corresponds to the selected time window.

Preferably, the time-window identifier includes a bit identifying the selected time window, such as, for example, exactly one bit identifying the selected time window.

The selected time window preferably includes at least one of the following: a part of a day, a day, more than one day, a week, and a specific weekday within a period of at least one month.

Additionally, the method also includes receiving an input indicating a selected program, the input at least one of comprises and refers to a program identifier identifying the selected program, and using the program identifier to filter the plurality of virtual containers so as to obtain a subset of the program meta-data which corresponds to the selected program.

Preferably, the program identifier includes a virtual container identifier (container_id).

Additionally, the method also includes receiving an input indicating a selected service, the input at least one of comprises and refers to a service identifier identifying the selected service, and using the service identifier to filter the plurality of virtual containers so as to obtain a subset of the program meta-data which corresponds to the selected service.

Preferably, the service identifier includes a container_id.

Further additionally, the method also includes receiving an input indicating at least one editorial attribute in the program meta-data, and filtering the plurality of virtual containers so as to obtain a subset of the program meta-data which corresponds to the at least one editorial attribute.

There is also provided in accordance with a preferred embodiment of the present invention a method of grouping program meta-data, the method including normalizing program meta-data of instances of programs which share at least one editorial description item of the content to produce a set of program identifiers, grouping the instances of the programs by time windows to produce a set of time-window identifiers, placing the program meta-data in virtual containers, and associating the virtual containers with the set of program identifiers and the set of time-window identifiers.

Additionally, the method also includes transmitting the virtual containers, the associated set of program identifiers, and the associated set of time-window identifiers.

Preferably, the transmitting includes conveying the virtual containers, the associated set of program identifiers, and the associated set of time-window identifiers as MPEG-2 private sections.

Further preferably, the transmitting includes conveying the virtual containers, the associated set of program identifiers, and the associated set of time-window identifiers in at least one PID (Packet Identification) stream.

The conveying preferably includes conveying in a distinct PID stream all virtual containers with container identifiers that have a specific bit set.

Alternatively, the conveying includes conveying in a distinct PID stream all virtual containers that cover multiple periods of time.

Further alternatively, the conveying includes conveying in each distinct PID stream a group of virtual containers that covers a single unit of time.

Preferably, the transmitting includes reducing bandwidth per PID stream by distributing the virtual containers among a plurality of PID streams.

Additionally, the method also includes enabling bit assignment filtering throughout the plurality of PID streams.

Further additionally, the method also includes selecting the time windows according to a linear time base. The linear time base preferably includes a time unit equivalent to at least one of the following: a part of a day, and a day.

Alternatively, the method includes selecting the time windows according to a non-linear time base.

Preferably, at least one of the time windows includes at least one of the following: a part of a day, a day, more than one day, a week, and a specific weekday within a period of at least one month.

Additionally, the method also includes enabling access to the virtual containers, the associated set of program identifiers, and the associated set of time-window identifiers to allow a user to filter the program meta-data for obtaining a subset of the program meta-data. Preferably, the subset of the program meta-data includes a program meta-data subset which corresponds to at least one of the following: a time window, a service, a program, and at least one editorial attribute in the program meta-data.

There is also provided in accordance with a preferred embodiment of the present invention apparatus for accessing program meta-data, the apparatus including a receiver receiving a plurality of program meta-data virtual containers, at least one of the virtual containers including normalized program meta-data of programs having instances in a plurality of time windows, an input unit receiving an input indicating a selected time window, the input at least one of comprises and refers to a time-window identifier identifying the selected time window, and a processor using the time-window identifier to filter the plurality of virtual containers so as to obtain a subset of the program meta-data which corresponds to the selected time window.

Further in accordance with a preferred embodiment of the present invention there is provided apparatus for grouping program meta-data, the apparatus including a meta-data processor normalizing program meta-data of instances of programs which share at least one editorial description item of the content to produce a set of program identifiers, and grouping the instances of the programs by time windows to produce a set of time-window identifiers, and an encapsulation unit placing the program meta-data in virtual containers, and associating the virtual containers with the set of program identifiers and the set of time-window identifiers.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

In conventional EPG technology, data for drawing a single screen of an EPG grid is made available to the EPG at the time of drawing the EPG grid. Since typically an entire EPG dataset is not stored in an STB memory due, for example, to limitations of memory capacity at the STB, such EPG dataset is typically split up and only part of the EPG dataset is held in the STB memory at a time. The EPG dataset is typically split up by time, so that only part of the EPG dataset, which is required for a time period being displayed in the EPG grid, is actually loaded in the STB memory at the time of display.

There are however systems, such as systems conforming to TV-Anytime specifications as described at the TV-Anytime Forum website www.tv-anytime.org, in which EPG grid data is normalized. In systems that conform to TV Anytime specifications for example, normalization is obtained by grouping by "program" and hence meta-data of all instances that share the same program details are grouped together.

If grouping is made by program, such grouping may conflict with EPG dataset splitting by time, since all instances of a program may be in different time groups. The present invention, in preferred embodiments thereof, enables grouping of programs by time while maintaining a normalized EPG dataset.

In some preferred embodiments of the present invention normalization of the EPG dataset, or of parts of an EPG, includes grouping of instances of programs that share more than one editorial description item of the content, and preferably grouping of instances of programs that share most of the editorial description items of the content or all of the editorial description items of the content.

Figure 1:
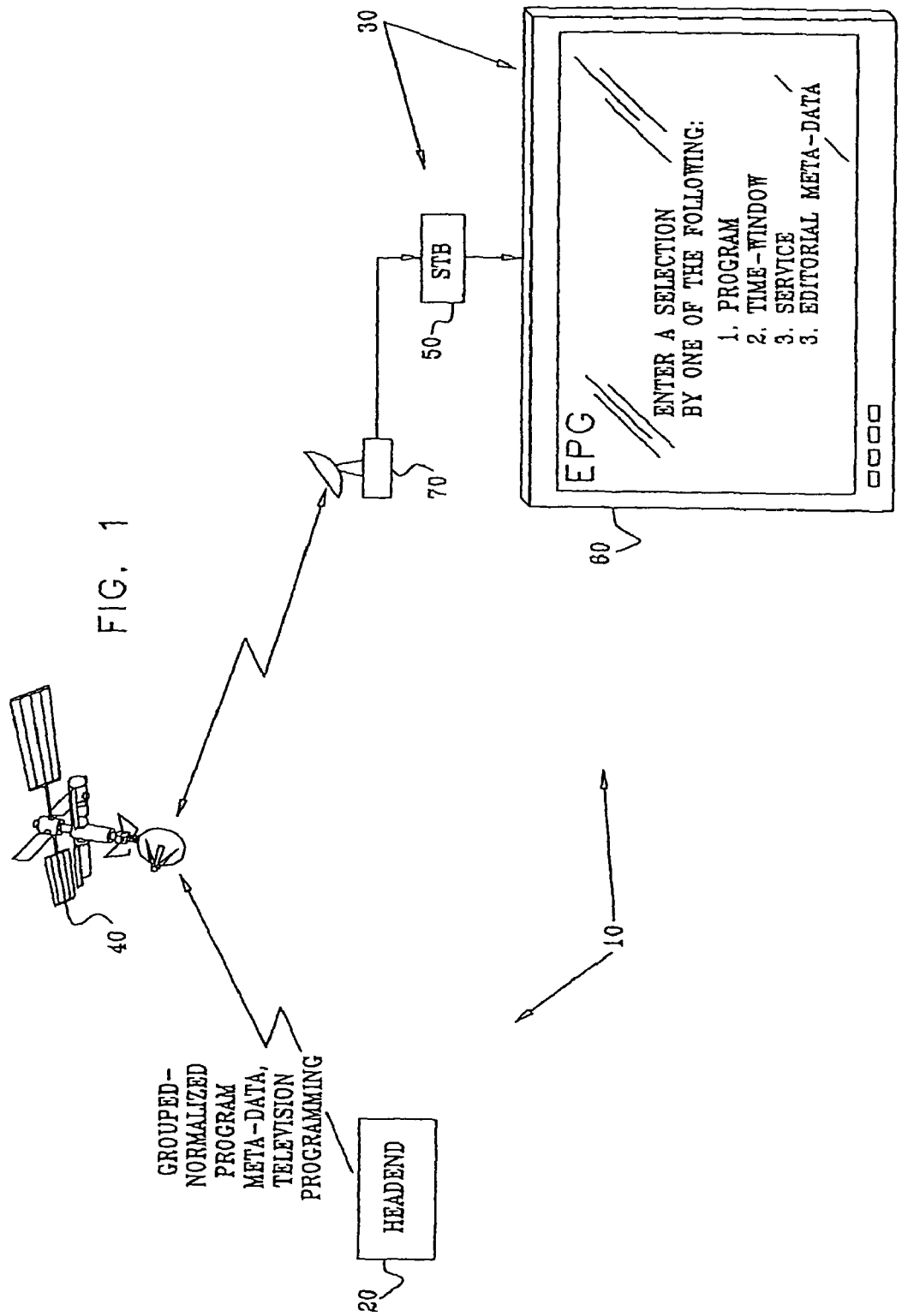
FIG. 1 is a simplified partly pictorial, partly block diagram illustration of a preferred implementation of an EPG system constructed and operative in accordance with a preferred embodiment of the present invention.

Reference is now made to FIG. 1, which is a simplified partly pictorial, partly block diagram illustration of a preferred implementation of an EPG system 10 constructed and operative in accordance with a preferred embodiment of the present invention.

In the EPG system 10, a headend 20 preferably transmits to a user unit 30 or to a plurality of user units 30 EPG information as well as television programming for which the EPG information is intended. By way of example, which is not meant to be limiting, the headend 20 transmits the EPG information and the television programming via a satellite 40. Alternatively, the headend 20 may transmit the EPG information and the television programming to the user unit 30 or to the plurality of user units 30 via at least one of the following: a cable based communication network; a conventional terrestrial broadcast television network; a telephony based communication network; a telephony based television broadcast network; a mobile-telephony based television broadcast network; an Internet Protocol (IP) television broadcast network; and a computer based communication network. An example of an appropriate telephony or IP based television broadcast network includes, for example, a Synamedia™ system, commercially available from NDS Limited, One London Road, Staines, Middlesex, TW18 4EX, United Kingdom.

The television programming preferably includes at least one of the following: pay and/or non-pay television programming; multimedia information; audio programs; data; games; and information from computer based networks such as the Internet.

For simplicity of depiction and description, and without limiting the generality of the foregoing, only one user unit 30 is illustrated in FIG. 1 and referred to below. The user unit 30 preferably includes a set-top box (STB) 50, and a display 60 which is operatively associated with the STB 50 and is operative to display EPG information and television programming received and processed at the STB 50. The display 60 may comprise any appropriate display such as a television or a computer monitor. By way of example, which is not meant to be limiting, the STB 50 receives the EPG information and the television programming via an antenna 70.

In operation, the headend 20 preferably normalizes program meta-data of instances of programs which share at least one editorial description item of content and preferably many editorial description items of the content, and groups the program meta-data to produce grouped-normalized program meta-data which constitutes EPG information for an EPG. The headend 20 then preferably broadcasts television programming and the grouped-normalized program meta-data to the user unit 30.

At the user unit 30, the television programming is received and processed at the STB 50 and displayed on the display 60 in accordance with selections of a user (not shown) of the user unit 30. The grouped-normalized program meta-data is also received and processed at the STB 50 and the user may preferably enter an EPG selection, which EPG selection may be entered by at least one of the following: a time window; a service; a program; and at least one editorial attribute in the program meta-data. The at least one editorial attribute preferably includes any appropriate editorial attribute such as, for example, a program category or sub-category.

Figure 2:
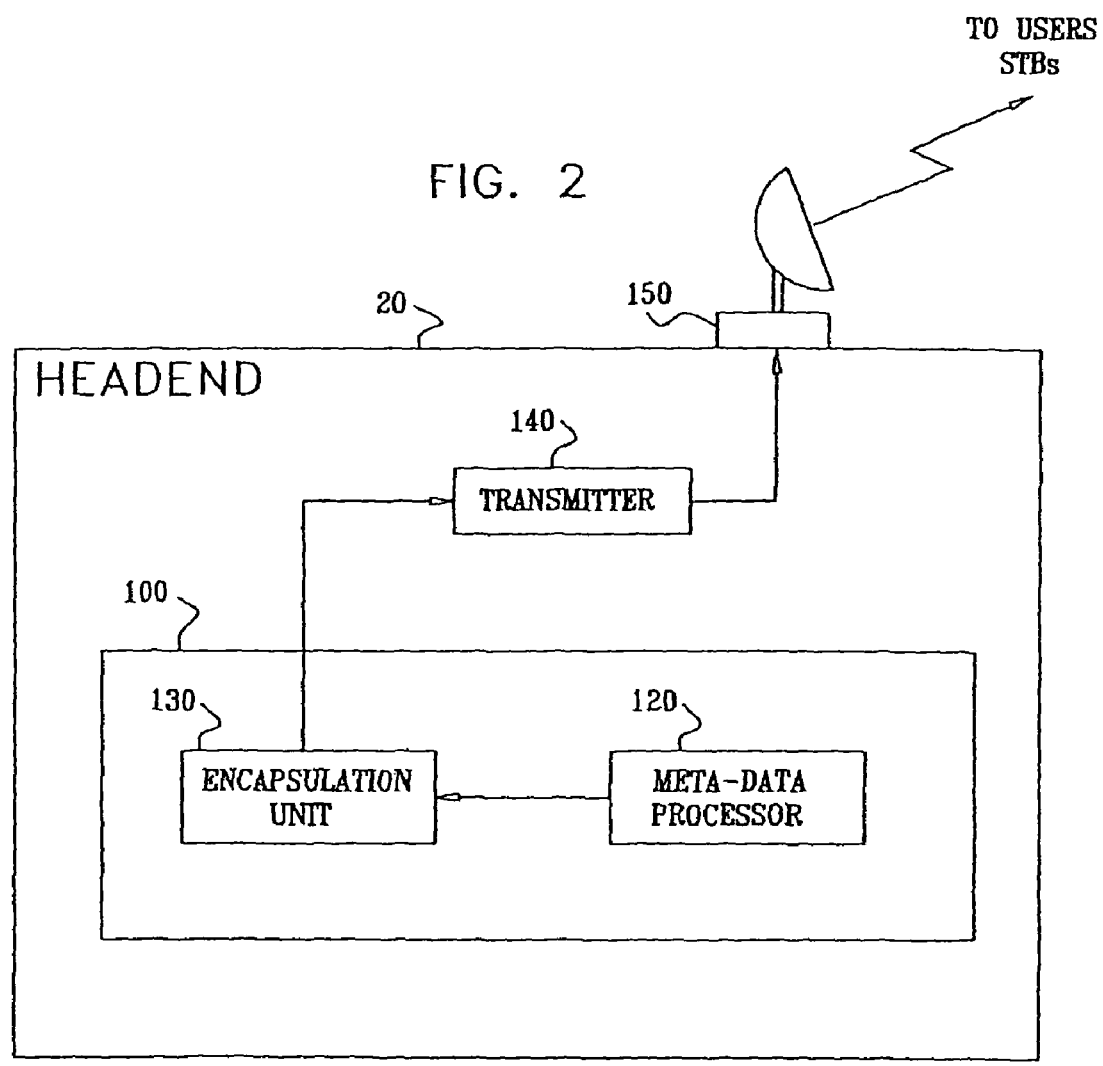
FIG. 2 is a simplified block diagram illustration of a preferred implementation of apparatus for grouping program meta-data in the EPG system of FIG. 1, the apparatus being constructed and operative in accordance with a preferred embodiment of the present invention.

Reference is now made to FIG. 2, which is a simplified block diagram illustration of a preferred implementation of apparatus 100 for grouping program meta-data in the EPG system 10 of FIG. 1, the apparatus 100 being constructed and operative in accordance with a preferred embodiment of the present invention.

The apparatus 100 is preferably comprised in the headend 20 of FIG. 1. The apparatus 100 preferably includes a meta-data processor 120 and an encapsulation unit 130. The meta-data processor 120 may, for example, include a conventional microprocessor or a conventional micro-controller. The meta-data processor 120 preferably processes meta-data of programs offered in an EPG. The meta-data processor 120 preferably normalizes program meta-data of instances of programs which share at least one editorial description item of content to produce a set of program identifiers, and groups the instances of the programs by time windows to produce a set of time-window identifiers.

The encapsulation unit 130 preferably places the program meta-data in virtual containers, and associates the virtual containers with the set of program identifiers and the set of time-window identifiers. The term "virtual container" is used throughout the present specification and claims to refer to a block of information to be transported, which block of information includes communication payload, addressing information, and overhead information. The encapsulation unit 130 thus prepares the program meta-data for addressing by a user, as described below, through an addressing mechanism which allows the user to filter the program meta-data by at least one of the following: time; service; program; and at least one editorial attribute in the program meta-data.

Preferably, in order to normalize the program meta-data, the meta-data processor 120 scans instances of programs in the EPG and compares content description of the instances of the programs to determine equality of meta-data, such as equality of title, equality of synopsis, etc. The meta-data processor 120 then preferably groups, for each program, all instances of the program which share at least one editorial description item of the content to produce a program identifier which may be used to refer to the program. For example, a first instance of a single episode of a soap opera that is scheduled on a Monday morning and a second instance of the same episode of the soap opera that is scheduled on a Tuesday evening are grouped together as a program with a unique program identifier. Preferably, such grouping of all the instances of the programs in the EPG during an EPG period of, for example, a week results in a set of normalized programs and a set of program identifiers.

Figure 3:
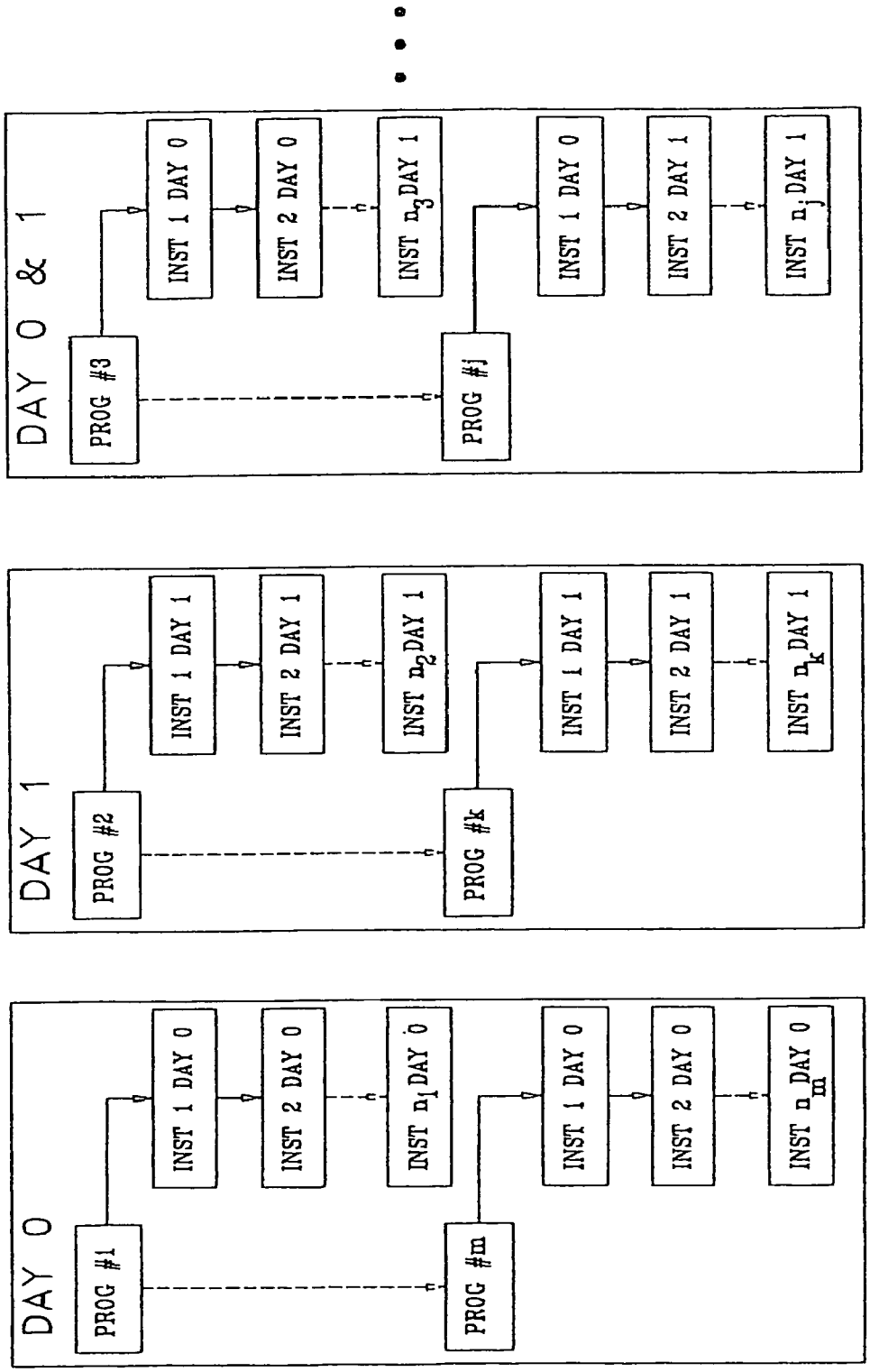
FIG. 3 is a simplified block diagram illustration of an example of a data organization diagram produced by the apparatus of FIG. 2.

The meta-data processor 120 also preferably groups the instances of the programs by time windows to produce a set of time-window identifiers. For example, the meta-data processor 120 may collect all programs for each unique set of days the programs have instances in. Thus, a group of programs is obtained which, for example, has the following instances: all in day 0 only, all in day 1 only, all in day 0 and day 1 only, etc. An example of such a data organization diagram, which is produced by the apparatus 100, is depicted in FIG. 3.

Preferably, the meta-data processor 120 selects the time windows according to one of the following: a linear time base; and a non-linear time base.

The term "linear time base" is used throughout the present specification and claims to refer to a time base in a linear form in which time windows are calculated as a polynomial of a first degree of a time unit quantity. For example, for a time unit of 1 day, the time window may be an integer number of days, such as 1 day, 2 days, 3 days, etc.

Preferably, the linear time base includes a time unit equivalent to at least one of the following: a part of a day; and a day.

The term "non-linear time base" is used throughout the present specification and claims to refer to a time base other than a linear time base. For example, in a non-linear time base a first time window may be 6 hours, a second time window may be 6 hours, a third time window may be 12 hours, a fourth time window may be 24 hours, a fifth time window may be 24 hours, etc.

Preferably, regardless of whether a linear time base or a non-linear time base is used for selecting time windows, each time window preferably includes at least one of the following: a part of a day; a day; more than one day; a week; and a specific weekday within a period of at least one month, such as a first Saturday of a month.

Preferably, the encapsulation unit 130 assigns container identifiers (container ids) to the virtual containers in which the program meta-data is placed for identifying programs contained within a group. The container identifiers are preferably assigned using a bitfield assignment.

The encapsulation unit 130 is preferably operatively associated with a transmitter 140 in the headend 20. The transmitter 140 preferably transmits to the user unit 30 of FIG. 1, for example via an antenna 150, the virtual containers, the associated set of program identifiers, and the associated set of time-window identifiers. It is appreciated that the virtual containers together with the associated set of program identifiers and the associated set of time-window identifiers may be conveyed, for example, as MPEG-2 private sections in a broadcast network, or as Internet Protocol (IP) datagrams in an IP network. In a case where the virtual containers are conveyed as MPEG-2 private sections, the MPEG-2 table_id_extension and other fields are set as necessary to convey a container identifier. The MPEG-2 fields that are set are preferably determined according to a number of bits used for signalling the container identifier, and the used bits preferably include the first 96 bits in the private data of the MPEG-2 private section syntax. It is appreciated that any other suitable bits may alternatively or additionally be used.

The virtual containers together with the associated set of program identifiers and the associated set of time-window identifiers may preferably be carried in one or many different PID (PID—Packet Identification) streams. It is appreciated that assignment of container identifiers to PID streams is preferably performed in a way that reduces bandwidth per PID stream by distributing the virtual containers among a plurality of PID streams and also preferably allows for bit assignment filtering throughout the plurality of PID streams where the bit may, for example, correspond to a time window such as a specific day. Such filtering may, for example in a case where the amount of virtual containers is small, be enabled by conveying in a distinct MPEG-2 PID stream all virtual containers with identifiers that have only a single bit set, or by conveying in a distinct MPEG-2 PID stream all virtual containers that have a specific bit set. All other virtual containers may then be conveyed in a single PID stream that can be filtered using a conventional hardware bit mask section filtering. In another example, each group of virtual containers per a single unit of time may be carried in a distinct PID stream and all virtual containers that cover multiple periods of time may be carried in a separate PID stream.

Figure 4:
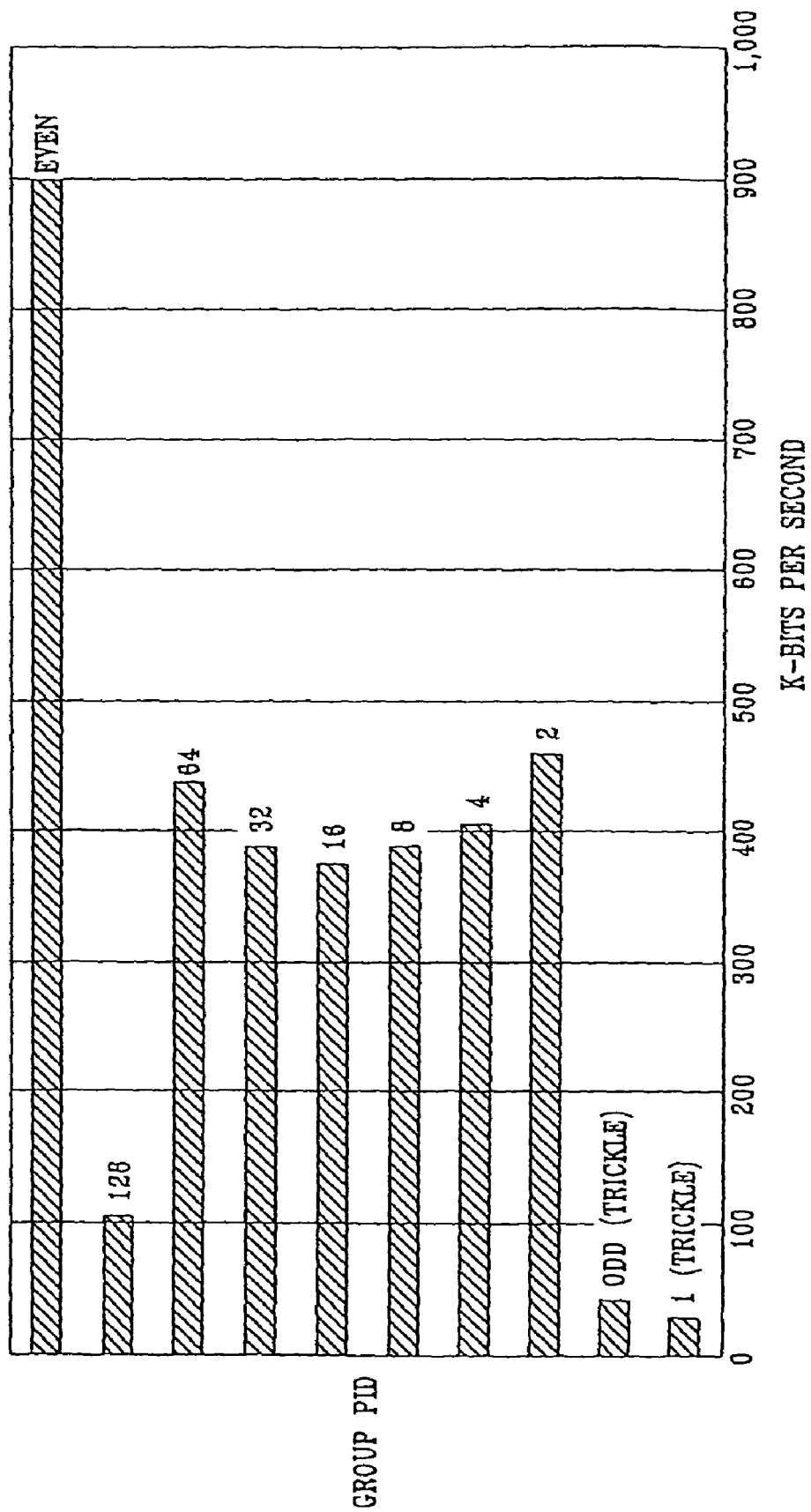
FIG. 4 is a bar graph illustration of an example of a distribution of bandwidth among a plurality of PID (Packet Identification) streams.

An example of a distribution of bandwidth among a plurality of PID streams with 147 bytes per program, a cycle time of 3.5 seconds, and a trickle time of 60 seconds is shown in Table 1 below and depicted in the form of a bar graph in FIG. 4.

TABLE 1

| Container Identifier | Programs | Percent | Bytes | kbps* 1 |
|---|---|---|---|---|
| 1 (Trickle) | 1468 | 10.53% | 215796 | 29 |
| Odd (Trickle) | 2181 | 15.64% | 320607 | 43 |
| 2 | 1367 | 9.80% | 200949 | 459 |
| 4 | 1208 | 8.66% | 177576 | 406 |
| 8 | 1155 | 8.28% | 169785 | 388 |
| 16 | 1117 | 8.01% | 164199 | 375 |
| 32 | 1157 | 8.30% | 170079 | 389 |
| 64 | 1302 | 9.34% | 191394 | 437 |
| 128 | 316 | 2.27% | 46452 | 106 |
| Even | 2675 | 19.18% | 393225 | 899 |
| Total | 13946 | 100.00% | 2050062 | 3,531 |

*kbps—kilo-bits per second

It is appreciated that conventionally a bit being set refers to the bit having a value "1" and a bit being clear refers to the bit having a value "0". It is however to be understood that referring to a bit set as having the value "0" and to a bit clear as having the value "1" is alternatively applicable in the present invention.

It is further appreciated that other transport mechanisms may alternatively be used. For example, broadcast or multicast IP may be used where filtering may be performed at one of the following layers of the International Standards Organization (ISO) seven-layer model: a Data Link Layer; a Network Layer; and a Transport Layer.

It is still further appreciated that PID assignment allows for a bandwidth per PID stream to be reduced while still allowing for low access times to data carried in the PID stream. Since some types of conventional STBs can only cope with a limited bandwidth in one PID stream, PID assignment in accordance with the present invention distributes the virtual containers over a few PID streams thus reducing bandwidth per PID stream to levels that the STBs can cope with. It is appreciated that access times to the data carried in the PID streams preferably remains acceptable.

Preferably, access to the virtual containers, the associated set of program identifiers, and the associated set of time-window identifiers is enabled to allow a user to filter the program meta-data for obtaining a subset of the program meta-data. The subset of the program meta-data preferably includes a program meta-data subset which corresponds to at least one of the following: a time window; a service; a program; and at least one editorial attribute in the program meta-data. Thus, in a case where the user filters the program meta-data for obtaining a subset of the program meta-data which corresponds to a specific time window, the user is preferably enabled to view a list of programs to be broadcast in the specific time window. In a case where the user filters the program meta-data for obtaining a subset of the program meta-data which corresponds to a specific service, the user is preferably enabled to view a list of programs offered in the specific service. In a case where the user filters the program meta-data for obtaining a subset of the program meta-data which corresponds to a specific program, the user is preferably enabled to view various time windows in which the specific program is to be broadcast. In a case where the user filters the program meta-data for obtaining a subset of the program meta-data which corresponds to at least one editorial attribute in the program meta-data, the user is preferably enabled to view a list of programs that share the at least one editorial attribute.

Figure 5:
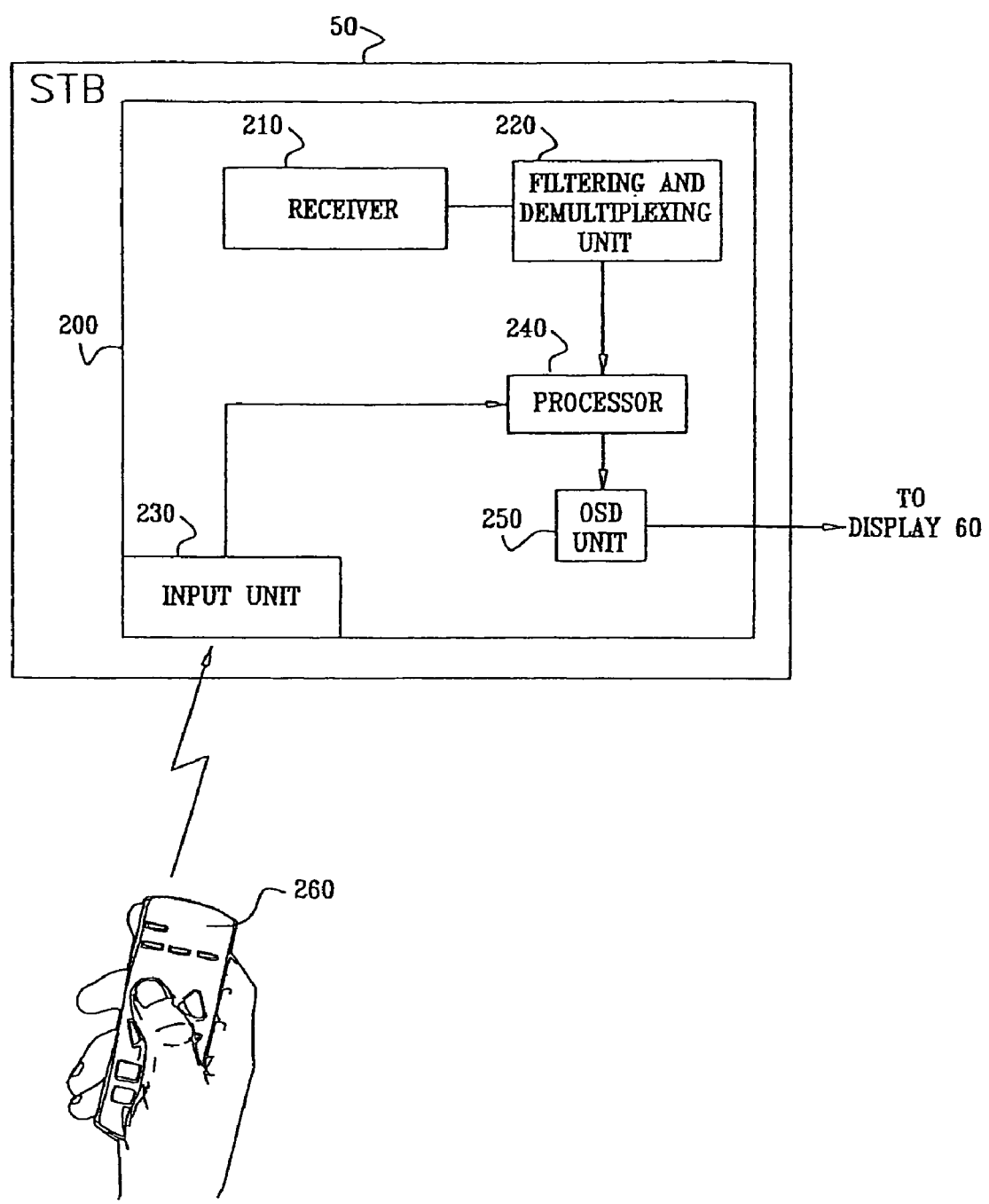
FIG. 5 is a simplified block diagram illustration of a preferred implementation of apparatus for accessing program meta-data, the apparatus being constructed and operative in accordance with a preferred embodiment of the present invention.

Reference is now made to FIG. 5, which is a simplified block diagram illustration of a preferred implementation of apparatus 200 for accessing program meta-data, the apparatus 200 being constructed and operative in accordance with a preferred embodiment of the present invention.

The apparatus 200 is preferably comprised in or associated with the STB 50 of FIG. 1. Preferably, the apparatus 200 includes the following elements: a receiver 210; a filtering and demultiplexing unit 220; an input unit 230; a processor 240; and an on-screen display (OSD) unit 250. The receiver 210, the input unit 230, the processor 240, and the OSD unit 250 may preferably include conventional elements of a conventional STB. The filtering and demultiplexing unit 220 preferably includes conventional filtering and demultiplexing hardware, and in a case where MPEG-2 is used, the filtering and demultiplexing unit 220 preferably includes conventional MPEG-2 filtering and demultiplexing hardware.

The receiver 210 preferably receives a plurality of program meta-data virtual containers, at least one of the virtual containers comprising normalized program meta-data of programs having instances in a plurality of time windows. The receiver 210 also preferably receives a set of program identifiers and a set of time-window identifiers that are associated with the virtual containers. It is appreciated that the receiver 210 may be comprised in or associated with a conventional integrated receiver and decoder (IRD) (not shown) of the STB 50.

The input unit 230 preferably receives an input indicating a selected time window, the input preferably at least one of comprises and refers to a time-window identifier identifying the selected time window. The input unit 230 may, for example, include an interface unit (not shown) that receives the input indicating the selected time window, as well as other possible instructions, from a user (not shown) via a remote control 260 communicating via any appropriate communications channel such as, for example, a wireless infrared link.

The processor 240 preferably uses the time-window identifier for filtering the plurality of virtual containers so as to obtain a subset of the program meta-data which corresponds to the selected time window. The time-window identifier includes a bit identifying the selected time window, and preferably exactly one bit identifying the selected time window.

The selected time window preferably includes at least one of the following: a part of a day; a day; more than one day; a week; and a specific weekday within a period of at least one month, such as a first Saturday of a month.

It is appreciated that the input unit 230 may alternatively or additionally receive from the user an input indicating a selected program, the input preferably at least one of comprises and refers to a program identifier identifying the selected program. In such a case, the processor 240 preferably uses the program identifier to filter the plurality of virtual containers so as to obtain a subset of the program meta-data which corresponds to the selected program. The program identifier preferably includes a virtual container identifier (container_id).

Further alternatively or additionally, the input unit 230 may receive from the user an input indicating a selected service, the input preferably at least one of comprises and refers to a service identifier identifying the selected service. In such a case, the processor 240 preferably uses the service identifier to filter the plurality of virtual containers so as to obtain a subset of the program meta-data which corresponds to the selected service. The service identifier preferably includes a container_id.

Still further alternatively or additionally, the input unit 230 may receive from the user an input indicating at least one editorial attribute in the program meta-data. In such a case, the processor 240 preferably filters the plurality of virtual containers so as to obtain a subset of the program meta-data which corresponds to the at least one editorial attribute.

In operation, the receiver 210 preferably receives transmissions in an MPEG-2 format. The transmissions preferably include a plurality of program meta-data virtual containers as well as a set of program identifiers and a set of time-window identifiers that are associated with the virtual containers. The processor 240 preferably processes the virtual containers, the set of program identifiers and the set of time-window identifiers in accordance with inputs inputted by the user via the remote control 260. Processing results of the processor 240 are, for example, provided to the OSD unit 250 for displaying on the display 60 of FIG. 1.

Preferably, the conventional MPEG-2 filtering and demultiplexing hardware in the filtering and demultiplexing unit 220 allows for acquisition of sections using a "filter". Such a filter is preferably applied by the processor 240 and it allows for a number of bits of a start of an MPEG-2 section to be compared with a filter value in such a way that some bits can be ignored, and bits that are not ignored can be compared to a desired value. Thus, the MPEG-2 filtering and demultiplexing hardware at the STB 50 and the processor 240 can be used by the apparatus 200 to filter MPEG-2 sections on a PID table_id_extension and on other fields for a given bit or bits being set or clear within a container_id, and as a result to acquire only programs that are to be presented in an EPG for a pre-specified time window.

A person skilled in the art will appreciate that similar filtering may be performed on IP datagrams in an IP network.

It is appreciated that the apparatus 200 of FIG. 5 together with the apparatus 100 of FIG. 2 may be referred to as an addressing mechanism that allows the user to filter the program meta-data virtual containers by at least one of the following: time; service; program; and at least one editorial attribute in the program meta-data.

An example of the operation of the apparatus 100 of FIG. 2 and the apparatus 200 of FIG. 5 is now briefly described.

A program has, for example, instances occurring on days $d_0, d_1, \ldots, d_n$, where n is the total number of discrete days in which the program has an instance, and $d_m$ is a given day in which the program has an instance. The program is then preferably placed in a virtual container whose identifier is based on bit numbers $d_0, d_1, \ldots, d_n$ as follows:

$$\text{container\_id} = 2^{d_0} + 2^{d_1} + \ldots + 2^{d_n} \tag{1}$$

For example, if the program has instances on $d_0$ and $d_3$, the container_id will be:

$$\text{container\_id} = 2^{d_0} + 2^{d_3}$$

In order to acquire all virtual containers for all programs having instances on a given day $d_m$, all virtual containers that have container_id with bit $d_m$ set are preferably acquired. Therefore, if the user inputs an instruction for displaying programs having instances on day $d_m$ in the EPG, the apparatus 200 preferably filters by performing the following logical operation: container_id AND $2^{d_m}$.

Referring, for example, to an EPG dataset of 8 days comprising days 0-7, there are 8 possible bit positions. The container_id may thus be any value from 1 to 255 for all permutations of the 8 days (container_id 0 does not occur because programs that occur in no days do not exist at all). All virtual containers for day 0 have bit 0 set, so 1, 3, 5, 7, . . . , 253, and 255. Hence, day 0 would have 128 virtual containers. The same applies for any other day $d_x$ which would have bit x set and 128 permutations of the remaining 7 bits. Thus, it is appreciated that 128 virtual containers are required for any day.

If all 128 virtual containers for day 0 are cached in a memory cache (not shown), then for any other day only 64 virtual containers are acquired. The reason for that is that 128 virtual containers have already been acquired for day 0 of which 50% have any given bit other than bit 0 set, and 50% have that bit clear, and thus 64 more virtual containers remain to be acquired (all the ones with bit 0 clear). Then, filtering by a logical operation comprising container_id AND $(2^0 | 12^m) = 2^m$ is performed in order to obtain the virtual containers with the bit set that are not in the memory cache, that is the ones with bit 0 clear.

As mentioned above, the time base does not have to be linear and does not have to refer to entire days. For example, units may be chosen in a non-linear mode to include, for example, the following:

Unit 0=the first 6 hours
Unit 1—the next 12 hours
Unit 2—the next 24 hours
Unit 3—the next 24 hours
Etc.

In such a case, in expression (1) above Unit 0 preferably replaces $d_0$, Unit 1 replaces $d_1$, etc.

In accordance with a preferred embodiment of the present invention cached virtual containers may be organized in a way which is more suitable for data caching. Referring, for example, to cached virtual containers at time window 0, a given number of virtual containers, for example 64 virtual containers, are preferably selected and filled with data equally. Thus, all the 64 virtual containers have approximately the same size. As a result, an integer number n of virtual containers may be cached by having only enough random access memory (RAM) storage capacity to store a total of n+1 virtual containers and still maintain access to data during an update.

Referring, for example to an EPG dataset of 7.25 days, the total number of programs is, for example 13946 and on average 135 bytes uncompressed are budgeted per program for title and synopsis strings. An instance of a program is, for example 10 bytes, and the strings can be compressed to 70%. Normalization is made by title and synopsis only. Taking, for example, the instances that have started or start in the first 6 hours to be 1357 and the amount of uncompressed strings required for these instances to be 183189 bytes, a required STB memory capacity is ((183189*70%)+(1357*10))*65/64)=141 Kbytes (approximately).

Figure 6:
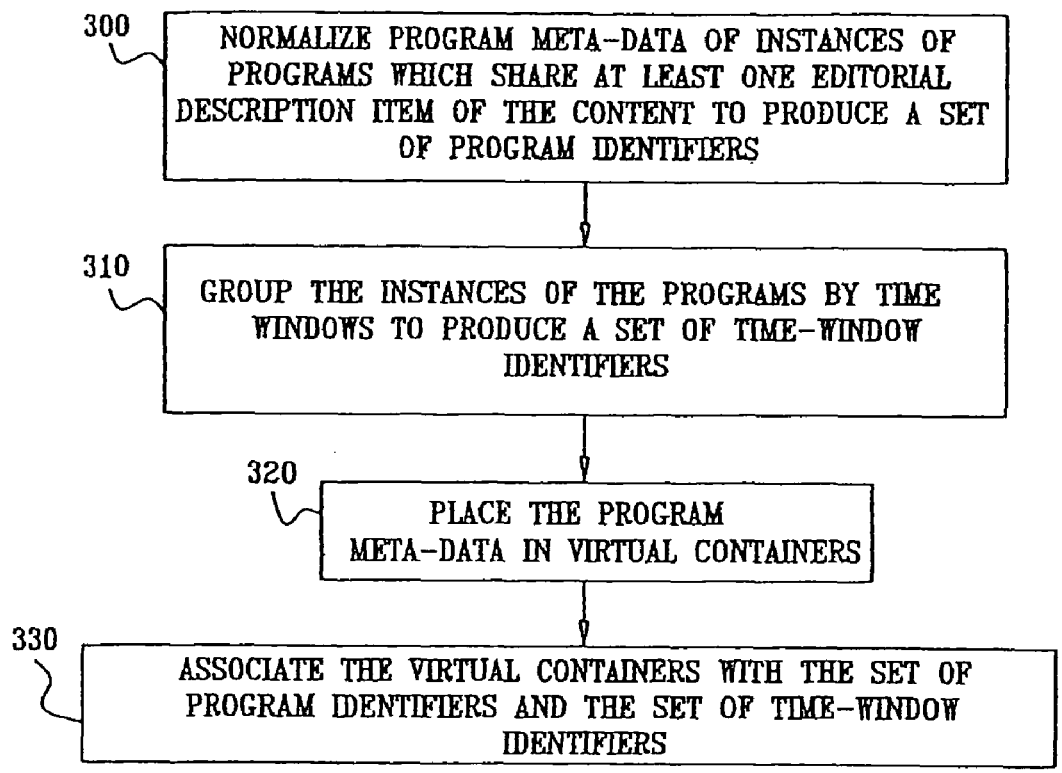
FIG. 6 is a simplified flowchart illustration of a preferred method of operation of the apparatus of FIG. 2.

Reference is now made to FIG. 6, which is a simplified flowchart illustration of a preferred method of operation of the apparatus 100 of FIG. 2.

Preferably, program meta-data of instances of programs which share at least one editorial description item of the content is normalized (step 300) to produce a set of program identifiers. Normalization is preferably performed in order to reduce program meta-data transmission bandwidth. The instances of the programs are preferably grouped (step 310) by time windows to produce a set of time-window identifiers. The program meta-data is then preferably placed (step 320) in virtual containers, and the virtual containers are preferably associated (step 330) with the set of program identifiers and the set of time-window identifiers.

Figure 7:
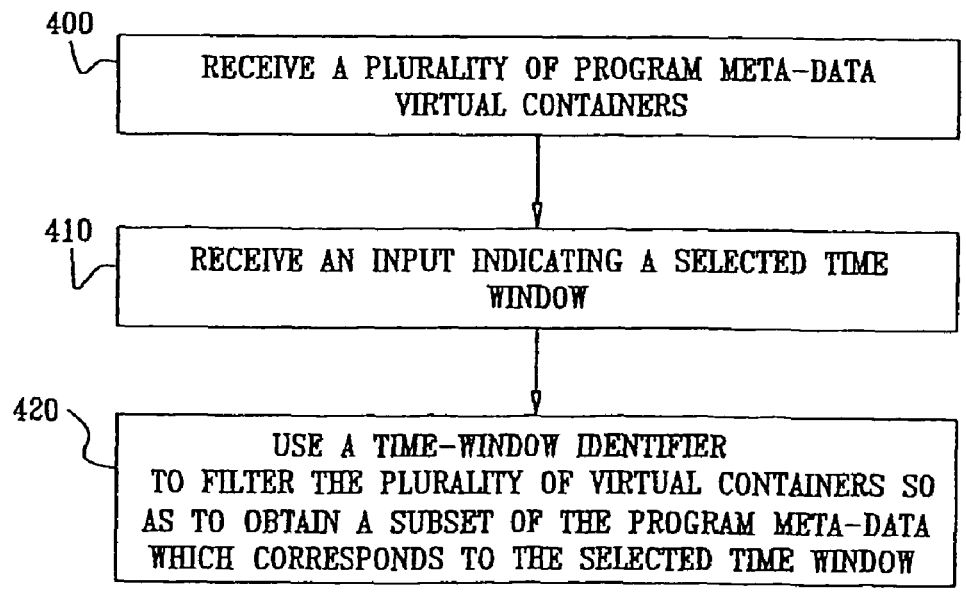
FIG. 7 is a simplified flowchart illustration of a preferred method of operation of the apparatus of FIG. 5.

Reference is now made to FIG. 7, which is a simplified flowchart illustration of a preferred method of operation of the apparatus 200 of FIG. 5.

Preferably, a plurality of program meta-data virtual containers is received (step 400). At least one of the virtual containers preferably includes normalized program meta-data of programs having instances in a plurality of time windows. An input indicating a selected time window is preferably received (step 410), where the input at least one of comprises and refers to a time-window identifier identifying the selected time window. The time-window identifier is preferably used (step 420) to filter the plurality of virtual containers so as to obtain a subset of the program meta-data which corresponds to the selected time window.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the claims which follow:

What is claimed is:

1. A method of grouping program meta-data which relates to all programs offered for viewing in an electronic program guide, the method comprising:
   scanning the program meta-data to determine program instances which share at least one item of editorial meta-data in the program meta-data;
   grouping the program meta-data into groups so that each group refers to a set of program instances that share at least one item of editorial meta-data;
   assigning each group of grouped program meta-data a unique program identifier, thereby producing a set of program identifiers;
   grouping sets of program instances by time windows to produce a set of time window identifiers in which each time window identifier is associated with at least one of the time windows;
   placing the program meta-data in virtual containers; and
   associating each virtual container with at least one program identifier from the set of program identifiers and at least one time window identifier from the set of time window identifiers.

2. The method according to claim 1 and wherein the unique program identifier comprises a virtual container identifier (container_id).

3. The method according to claim 1 and wherein each time-window identifier in the set of time-window identifiers comprises a time-window identifying bit.

4. The method according to claim 3 and wherein each time-window identifier in the set of time-window identifiers comprises exactly one time-window identifying bit.

5. The method according to claim 1 and also comprising:
   transmitting the virtual containers, the set of program identifiers, and the set of time-window identifiers.

6. The method according to claim 5 and wherein the transmitting comprises conveying the virtual containers, the set of program identifiers, and the set of time-window identifiers as MPEG-2 private sections.

7. The method according to claim 1 and also comprising selecting the time windows according to a linear time base.

8. The method according to claim 7 and wherein the linear time base comprises a time unit equivalent to at least one of the following: a part of a day; and a day.

9. The method according to claim 1 and also comprising selecting the time windows according to a non-linear time base.

10. The method according to claim 1 and wherein at least one of the time windows comprises at least one of the following: a part of a day;

a day; more than one day; a week; and a specific weekday within a period of at least one month.

11. The method according to claim 1 and also comprising: enabling access to the virtual containers, the set of program identifiers, and the set of time-window identifiers to allow a user to filter the program meta-data for obtaining a subset of the program meta-data.

12. The method according to claim 11 and wherein the subset of the program meta-data comprises a program meta-data subset which corresponds to at least one of the following: a time window; a service; a program; and at least one editorial attribute in the program meta-data.

13. Apparatus for grouping program meta-data which relates to all programs offered in an electronic program guide, the apparatus comprising:
a meta-data processor which is operative to perform the following:
scan the program meta-data to determine program instances which share at least one item of editorial meta-data in the program meta-data;
group the program meta-data into groups so that each group refers to a set of program instances that share at least one item of editorial meta-data in the program meta-data to produce grouped program meta-data;
assign each group of grouped program meta-data a unique program identifier, thereby producing a set of program identifiers;
group sets of program instances by time windows to produce a set of time window identifiers in which each time window identifier is associated with at least one of the time windows; and
an encapsulation unit which is operative to place the program meta-data in virtual containers, and to associate each virtual container with at least one program identifier from the set of program identifiers and at least one time window identifier from the set of time window identifiers.

14. Apparatus for grouping program meta-data which relates to all programs offered for viewing in an electronic program guide, the apparatus comprising:
means for scanning the program meta-data to determine program instances which share at least one item of editorial meta-data in the program meta-data, for grouping the program meta-data into groups so that each group refers to a set of program instances that share at least item of editorial meta-data in the program meta-data to produce grouped program meta-data, and for assigning each group of grouped program meta-data a unique program identifier, thereby producing a set of program identifiers;
means for grouping sets of program instances by time windows to produce a set of time window identifiers in which each time window identifier is associated with at least one of the time windows; and
means for placing the program meta-data in virtual containers, and for associating each virtual container with at least one program identifier from the set of program identifiers and at least one time window identifier from the set of time window identifiers.

15. A method of grouping program meta-data which relates to a plurality of programs, the method comprising:
selecting time windows according to a non-linear time base in which the time windows are computed on a basis other than a polynomial of a first degree of a time unit quantity, whereby at least some of the time windows have lengths which are different from lengths of other time windows;
assigning each of the time windows a unique time-window identifier, thereby producing a set of time-window identifiers;
grouping the program meta-data by the time windows;
placing the program meta-data in virtual containers; and
associating each virtual container with at least one time-window identifier from the set of time-window identifiers.

16. The method according to claim 15 and wherein at least one of the time windows comprises at least one of the following: a part of a day; a day; more than one day; a week; and a specific weekday within a period of at least one month.

17. The method according to claim 15 and wherein each time-window identifier in the set of time-window identifiers comprises a time-window identifying bit.

18. The method according to claim 17 and wherein each time-window identifier in the set of time-window identifiers comprises exactly one time-window identifying bit.

19. Apparatus for grouping program meta-data which relates to a plurality of programs, the apparatus comprising:
a meta-data processor which is operative to perform the following:
select time windows according to a non-linear time base in which the time windows are computed on a basis other than a polynomial of a first degree of a time unit quantity, whereby at least some of the time windows have lengths which are different from lengths of other time windows;
assign each of the time windows a unique time-window identifier, thereby producing a set of time-window identifiers; and
group the program meta-data by the time windows; and
an encapsulation unit which is operative to place the program meta-data in virtual containers, and to associate each virtual container with at least one time-window identifier from the set of time-window identifiers.

20. Apparatus for grouping program meta-data which relates to a plurality of programs, the apparatus comprising:
means for selecting time windows according to a non-linear time base in which the time windows are computed on a basis other than a polynomial of a first degree of a time unit quantity, whereby at least some of the time windows have lengths which are different from lengths of other time windows, for assigning each of the time windows a unique time-window identifier, thereby producing a set of time-window identifiers, and for grouping the program meta-data by the time windows; and
means for placing the program meta-data in virtual containers, and for associating each virtual container with at least one time-window identifier from the set of time-window identifiers.

* * * * *

UNITED STATES PATENT AND TRADEMARK OFFICE
CERTIFICATE OF CORRECTION

PATENT NO.         : 8,055,660 B2                                                    Page 1 of 1
APPLICATION NO.    : 12/928974
DATED              : November 8, 2011
INVENTOR(S)        : Bastable et al.

It is certified that error appears in the above-identified patent and that said Letters Patent is hereby corrected as shown below:

Delete "container_id AND $(2^0|12^m)=2^m$" and insert therefor
--container_id AND $(2^0|2^m) = 2^m$-- in column 11, lines 8-9.

Delete "Unit 0=the" and insert therefor --Unit 0 – the-- in column 11, line 16.

Delete "at least item" and insert therefor --at least one item-- in column 13, lines 45-46 (eighth and ninth lines of claim 14).

Signed and Sealed this
Fourth Day of September, 2012

David J. Kappos
*Director of the United States Patent and Trademark Office*